US006466222B1

(12) United States Patent
Kao et al.

(10) Patent No.: US 6,466,222 B1
(45) Date of Patent: Oct. 15, 2002

(54) APPARATUS AND METHOD FOR COMPUTING GRAPHICS ATTRIBUTES IN A GRAPHICS DISPLAY SYSTEM

(75) Inventors: Ming-Tsan Kao, Kaohsiung; Won-Yih Lin, Taichung Hsien, both of (TW)

(73) Assignee: Silicon Integrated Systems Corp., Hsinchu (TW)

( * ) Notice: Subject to any disclaimer, the term of this patent is extended or adjusted under 35 U.S.C. 154(b) by 0 days.

(21) Appl. No.: 09/414,911

(22) Filed: Oct. 8, 1999

(51) Int. Cl.[7] ................................................. G09G 5/36
(52) U.S. Cl. ........................................ 345/558; 345/581
(58) Field of Search ................................. 345/558, 581, 345/501, 418, 419, 530, 606, 619, 505

(56) References Cited

U.S. PATENT DOCUMENTS 5,337,410 A * 8/1994 Appel ........................ 345/501
5,485,559 A * 1/1996 Sakaibara et al. .......... 345/505
6,072,505 A * 6/2000 Piazza et al. ............... 345/501

* cited by examiner

*Primary Examiner*—Kee M. Tung

(57) ABSTRACT

A three-dimensional graphics display system has a computational unit for computing the attribute values of several successive pixels at the same time for a specific graphics attribute. By time-sharing the computational unit, multiple graphics attributes can be computed using only one computational unit. The attribute values for each graphics attribute of the successive pixels are buffered in a special merge FIFO which may have a group of output data paths for sending out the attribute values of a group of pixels each computation cycle. There are multiple merge FIFOs for buffering the attribute values of the multiple graphics attributes. After the attribute values for all the desired graphics attributes for a group of pixels are available, the buffered attribute values for the group of pixels are sent out through their respective data paths. By using a pipeline architecture in the design, a high performance and low cost computation engine is provided for the three-dimensional graphics display system.

10 Claims, 5 Drawing Sheets

APPARATUS AND METHOD FOR COMPUTING GRAPHICS ATTRIBUTES IN A GRAPHICS DISPLAY SYSTEM

FIELD OF THE INVENTION

This invention relates to the computation of graphics attributes in a three-dimensional graphics system, and more specifically to an apparatus and method for computing graphic attributes of multiple pixels for multiple data paths simultaneously.

BACKGROUND OF THE INVENTION

Conventional three-dimensional display system processes graphics or pictures one pixel at one time using one data path. Graphics recessing using single data path usually does not satisfy the requirement of a high performance display that is rich in functionality. Parallel processing for multiple pixels using multiple data paths has become a major trend in the hardware design of a display system.

The drawback of a parallel processing system is that almost every hardware module used in a single data path has to be duplicated for a system having double data paths. The die size of an IC chip designed for parallel processing is, therefore, twice of the IC chip which uses only a single data path theoretically. In practice, the die size is more than doubled because more control circuits are required for the double data paths. Hardware Resource sharing is one of the solutions to overcoming the drawback of a parallel processing system.

There are some interpolation functions that have to be implemented in a three-dimensional graphics display system, for example, color interpolation, texture coordinate interpolation and depth value interpolation. Color interpolation is used to generate the pixel colors during scan conversion of a primitive, such as line or a triangle. By interpolating between the colors of vertices, the pixel colors of a primitive are derived. Interpolation between two vertex colors is often done for line primitive color interpolation, and among three vertex colors for triangle primitive color interpolation.

Similarly, texture coordinate interpolation is used to generate the corresponding texture coordinates, and depth value interpolation is used to generate the corresponding depth values of pixels within a primitive during the scan conversion process. For the purpose of easy explanation, the following description uses the color interpolation function as an example. As for the other interpolation functions, the technique can be easily applied in a similar way.

There are several color attributes that are used in a 3D rendering process. Generally, there are Alpha ($\alpha$), Red (R), Green (G), Blue (B), Specular Red ($S_R$), Specular Green ($S_G$) Specular Blue ($S_B$) and Fog (F). The alpha value is used for alpha test and alpha blending to generate the effect of transparency or translucency. Red, green and blue are the pixel's color values and are used to combine with texture color.

Specular red, specular green and specular blue are the specular components of a primitive and are used in the specular blending for specular effect. Fog attribute is used in the fog blending module to generate fog effect. For one data path, there are eight attributes that have to be calculated. If it is extended to two data paths, there are 16 attributes to calculate. The cost of the hardware circuit to accomplish two data paths is too expensive if the original design for one data path is simply duplicated.

There is an important similarity between the eight attributes in that they are all generated by similar equations in the form of $A*X+B*Y+C$. In the equation, X and Y are the coordinate values of an incoming pixel, and A, B and C are the attribute coefficients for each of the eight attributes. That is, an incoming pixel uses the same (X, Y) and different (A, B, C) to generate the eight attributes by using the same equation. Assume that, $(A_\alpha, B_\alpha, C_\alpha)$ are the alpha attribute coefficients. $(A_R, B_R, C_R)$, $(A_G, B_G, C_G)$ and $(A_B, B_B, C_B)$ are the pixel color attribute coefficients. $(A_{SR}, B_{SR}, C_{SR})$, $(A_{SG}, B_{SG}, C_{SG})$ and $(A_{SB}, B_{SB}, C_{SB})$ are the specular color attribute coefficients. $(A_F, B_F, C_F)$ are the fog attribute coefficients. The corresponding equations to calculate the eight attributes are listed below:

$$A_\alpha*X+B_\alpha*Y+C_\alpha=\alpha$$

$$A_R*X+B_R*Y+C_R=R$$

$$A_G*X+B_G*Y+C_G=G$$

$$A_B*X+B_B*Y+C_B=B$$

$$A_{SR}*X+B_{SR}*Y+C_{SR}=S_R$$

$$A_{SG}*X+B_{SG}*Y+C_{SG}=S_G$$

$$A_{SB}*X+B_{SB}*Y+C_{SB}=S_B$$

$$A_F*X+B_F*Y+C_F=F$$

Although the eight equations are similar, the circuit for calculation are not shared in a conventional three-dimensional graphics system because of the performance consideration. That is, there is a constraint on the minimum throughout of one pixel data generated per clock cycle. Therefore, there are eight hardware circuits computing similar equations in the color interpolation module for the case of one data path. For the case of double data paths, the hardware circuits become at least doubled.

FIG. 1 shows a typical block diagram of computing color shading for one data path. Each block of color shading computes the function, $A*X+B*Y+C$, where X, and Y are the coordinates of a specific pixel; A, B, and C are attribute coefficients. The attributes include color attributes ($\alpha$, R, G, B), specular color attributes ($S_R$, $S_G$, $S_B$), and fog color attribute (F). Conventionally, to achieve higher performance, eight color shading blocks are needed to compute all the eight attributes simultaneously.

FIG. 2 shows a block diagram of computing color shading using two data paths. There are two sets of attributes that have to be generated for two pixels respectively. FIG. 2 is a straightforward implementation which simply duplicates the circuit used in FIG. 1. The color, specular and fog attribute coefficients are sent to both of the two data paths with coordinates $(X_0, Y_0)$ and $(X_1, Y_1)$. It is obvious that there are sixteen function blocks performing the equation $A*X+B*Y+C$ for different attributes. The design requires many gates and consumes a lot of area in an IC chip. There is a strong need for an economic way to achieve high performance color shading design with a less number of gates.

SUMMARY OF THE INVENTION

This invention has been made to satisfy the need of a high performance design for a three-dimensional graphics engine in a graphics display system. The primary object of the invention is to provide an apparatus and method that can compute several graphic attributes using a time-shared computational hardware. Another object is to provide a pipeline design for outputting the graphic attributes through several data paths.

According to this invention, a computational unit is used to compute the attribute values of a plurality of successive pixels simultaneously in a computational cycle for a desired attribute. The computed attribute values are sent to as a group and buffered in a special FIFO which has at least one output data path. In a next computational cycle, the attribute values of another desired attribute can be computed for the successive pixels using the same computational unit. The computed attribute values are sent as another group to another FIFO which also has the same number of output data paths.

After the attribute values of all desired attributes are computed and available, the buffered attribute values are sent to the output data paths. The attribute values of several pixels can be sent out to the different output data paths simultaneously. Because the design has a pipeline architecture, the computational unit is time shared for computing the attribute values of multiple attributes cycle by cycle and the special FIFO buffer provides a mechanism to buffer the attribute values and then send them out after the other attributes are available for the multiple data paths.

DETAILED DESCRIPTION OF THE INVENTION

Figure 1:
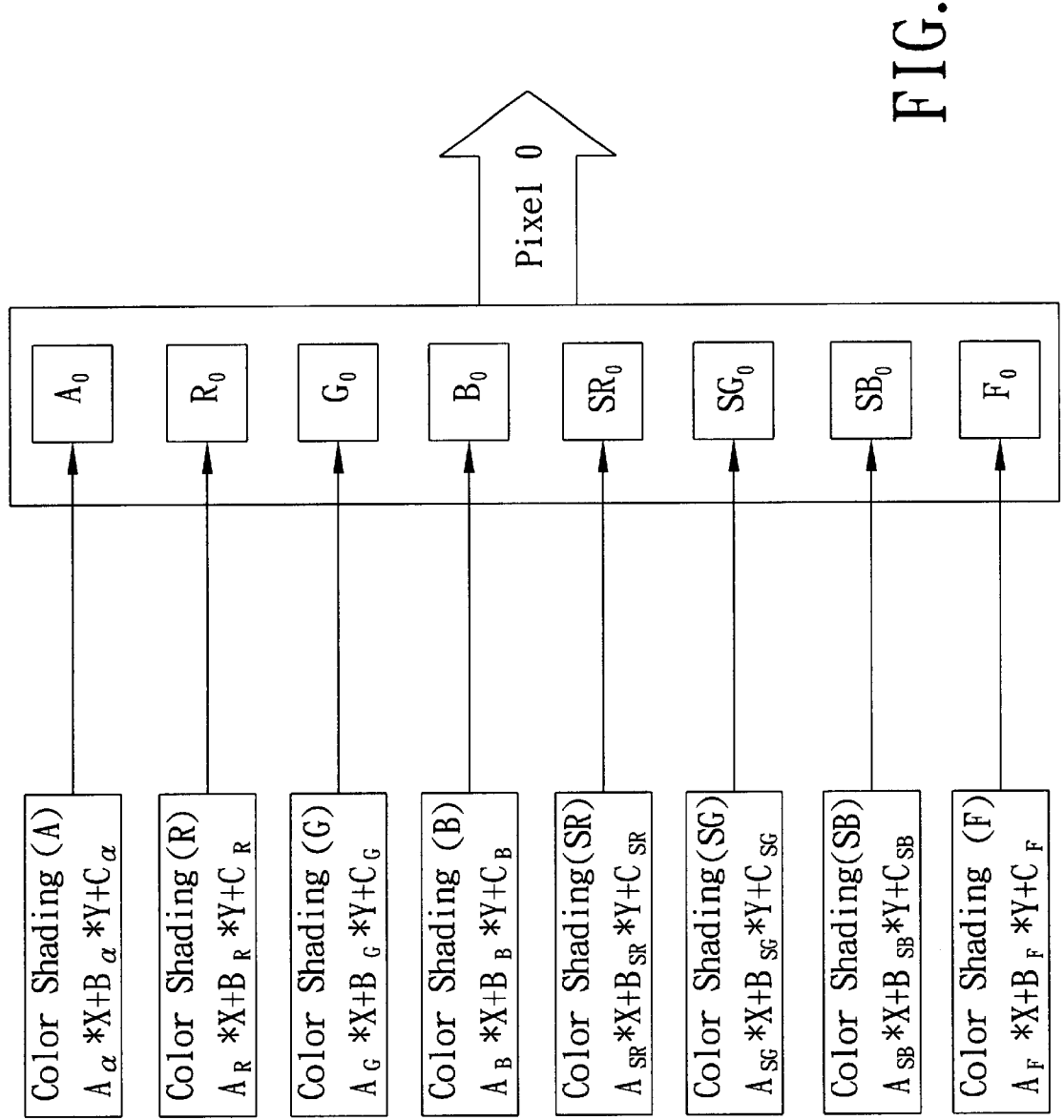
FIG.1 shows the block diagram of typical color shading in a conventional three-dimensional graphics display system.
Figure 2:
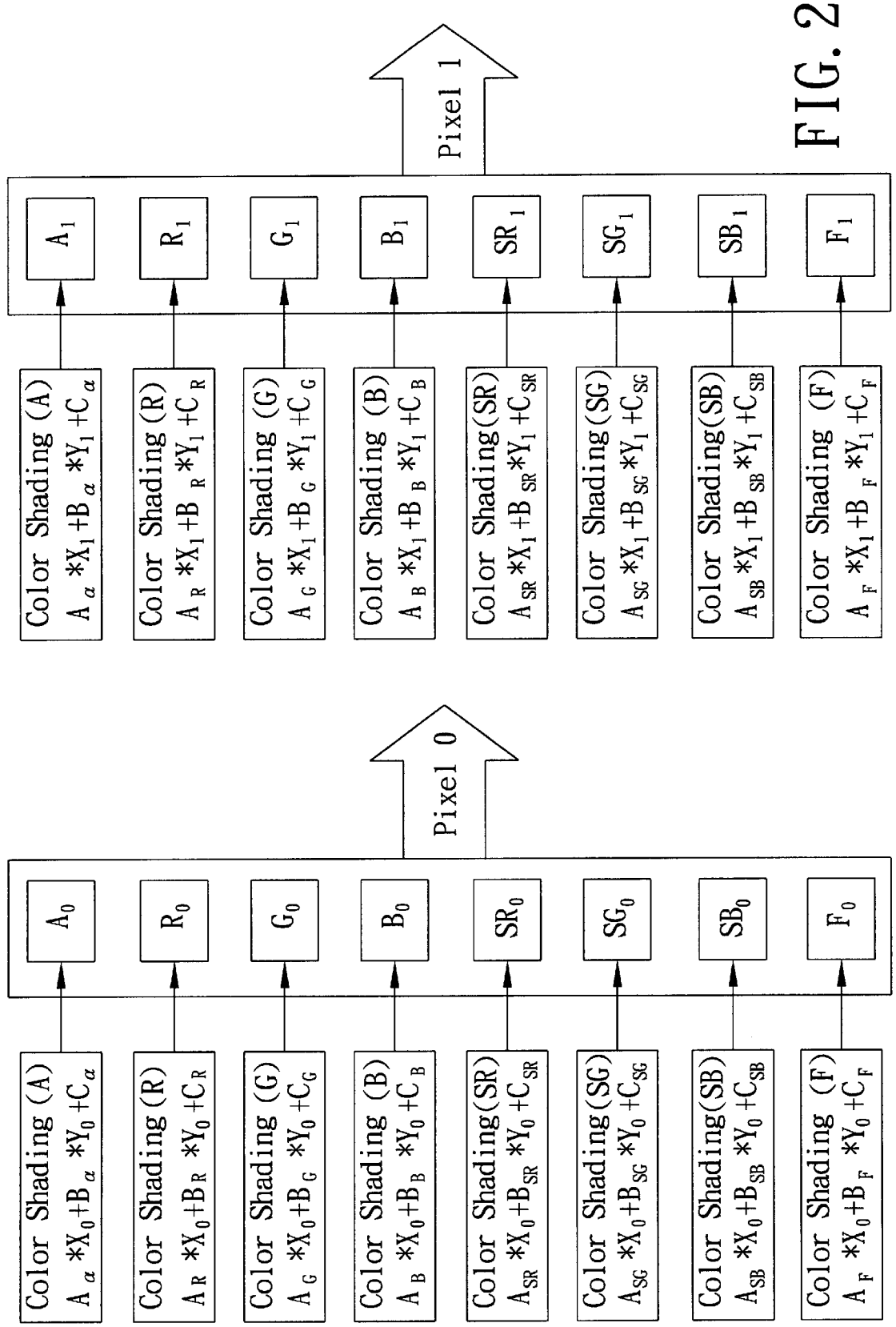
FIG.2 shows the block diagram of typical color shading using two data paths in a conventional three-dimensional graphics display system.
Figure 3:
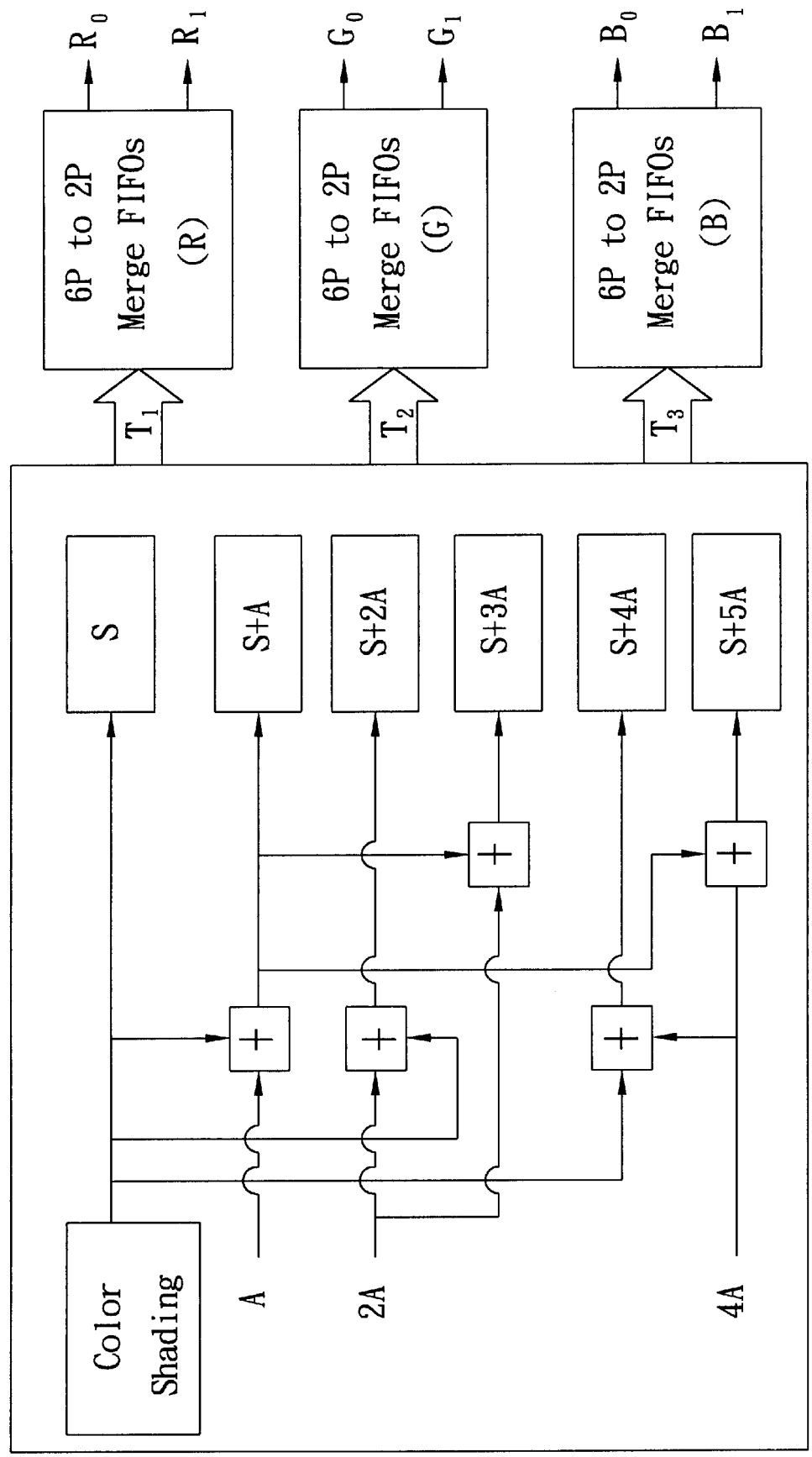
FIG.3 shows a partial block diagram of present invention used in color shading.

As described earlier, there are many graphics attributes that are computed the same way in a three-dimensional graphics display system. The following description uses color shading as an example to describe the invention. It should be noted that the present invention is only limited by the appended claims. FIG. 3 is the block diagram of the present invention for color shading with two data paths. In this example, six pixels are processed concurrently. A complete block diagram for computing eight color attributes is further shown in FIG. 4. The number of data paths and the number of processed pixels are adjustable depending on the application. The color shading block as shown in FIG. 3 implements the function, A*X+B*Y+C, which calculates the required attributes.

The six pixels are chosen from successive pixels in a scan line, that is, they have same y coordinate value and the difference of the x coordinate values between two successive pixels is one. According to the equation, if two pixels with x values being different by one and y values being identical, the difference for a desired attribute between these two adjacent pixels is A. Therefore, if a specific attribute of the first pixel is S, then the successive pixels' attributes are S+A, S+2A, S+3A, S+4A and S+5A, respectively. By using this principle, FIG. 3 shows an implementation of computing one specific attribute for all six pixels.

To explain the concept of time sharing in the present invention, FIG. 3 gives an example which simultaneously calculates a specific attribute for six successive pixels. Moreover, two data paths are adopted in the subsequent processing. With specific X and Y coordinate values, the attributes of pixels (X, Y), (X+1, Y), (X+2, Y), (X+3, Y), (X+4, Y) and (X+5, Y) are generated.

In the example of FIG. 3, at time T1, the red attributes R0 to R5 of the six pixels are generated. They are sent to the "6P to 2P merge FIFOs" for R attribute. The FIFOs buffers the input attribute values of six pixels and sends out the attribute values of two pixels per clock cycle for further processing in the subsequent two data paths. Therefore, it needs three clock cycles to convert the input attribute values of six pixels as three two-pixel attribute value outputs, $T_1$ for $R_0$ and $R_1$, $T_2$ for $R_2$ and $R_3$, $T_3$ for $R_4$ and $R_5$.

After the calculation of attribute R is complete at $T_1$, the calculation of attribute G is initiated. With the same color shading block but different attribute coefficients, the green attributes $G_0$ to $G_5$ can be generated. That is, the coefficients $A_R$, $B_R$ and $C_R$ are replaced by $A_G$, $B_G$ and $C_G$ respectively. Because it is a pipelined design, at time $T_2$, the green attributes $G_0$ to $G_5$ are ready and sent to another "6P to 2P merge FIFOs". Similarly, at time $T_3$, the blue attributes $B_0$ to $B_5$ are ready and sent to the last "6P to 2P merge FIFOs". After that, the red, green and blue attributes for the next six pixels are generated again alternatively.

It can be seen that, at $T_1$, $R_0$ to $R_5$ are ready in the FIFOs; at $T_2$, $G_0$ to $G_5$ are ready; and at $T_3$, $B_0$ to $B_5$ are ready for access. That is, at $T_3$, the first two sets of (R, G, B) are ready for subsequent processing. Specifically, at $T_3$, ($R_0$, $G_0$, $B_0$,) can be processed by one data path and ($R_1$, $G_1$, $B_1$) by another data path. Likewise, ($R_2$, $G_2B_2$) and ($R_3$, $G_3$, $B_3$) can be processed at $T_4$, and ($R_4$, $G_4$, $B_4$) and ($R_5$, $G_5$, $B_5$) can be processed at $T_5$.

Figure 4:
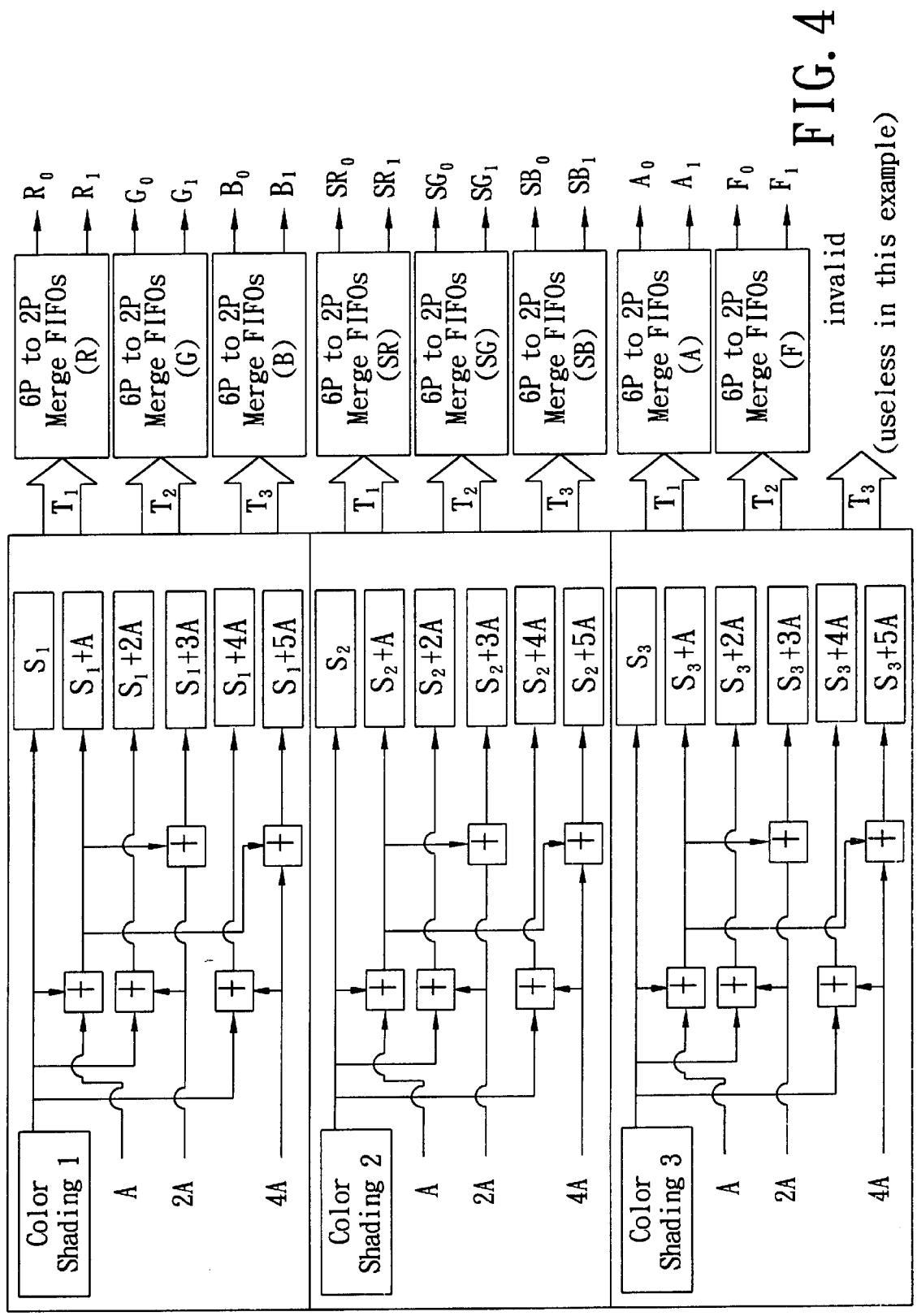
FIG.4 shows the complete block diagram of this invention for color shading.

In the mean time, $R_6$ to $R_{11}$, or the next scan line $R_0$ to $R_5$ are computed and ready in the FIFO at $T_4$, $G_6$ to $G_{11}$ are ready at $T_5$, and $B_6$ to $B_{11}$ are ready at $T_6$. Therefore, at $T_6$, another two sets of (R, G, B) are ready for further processing. That is, ($R_6$, $G_6$, $B_6$) and ($R_7$, $G_7$, $B_7$) can be processed at $T_6$, ($R_8$, $G_8$, $B_8$) and ($R_9$, $G_9$, $B_9$) can be processed at $T_7$, and ($R_{10}$, $G_{10}$, $B_{10}$) and ($R_{11}$, $G_{11}$, $B_{11}$) can be processed at $T_8$. The above example shows that only one color shading block is used to generate three attributes, R, G and B, alternatively. For the case of generating eight attributes including specular color and fog color, it can be realized by using three similar blocks as in FIG. 3, and the design is shown in FIG. 4.

Note that, all of the designs are pipelined so that it can achieve one throughput per clock cycle no matter how much time the color shading block and adders take. Moreover, the "6p to 2P merge FIFOs" module includes at least one six-pixel FIFO and three two-pixel FIFOs. The number of FIFOs are extendible, it depends on the consumption rate of the following processes.

Figure 5:
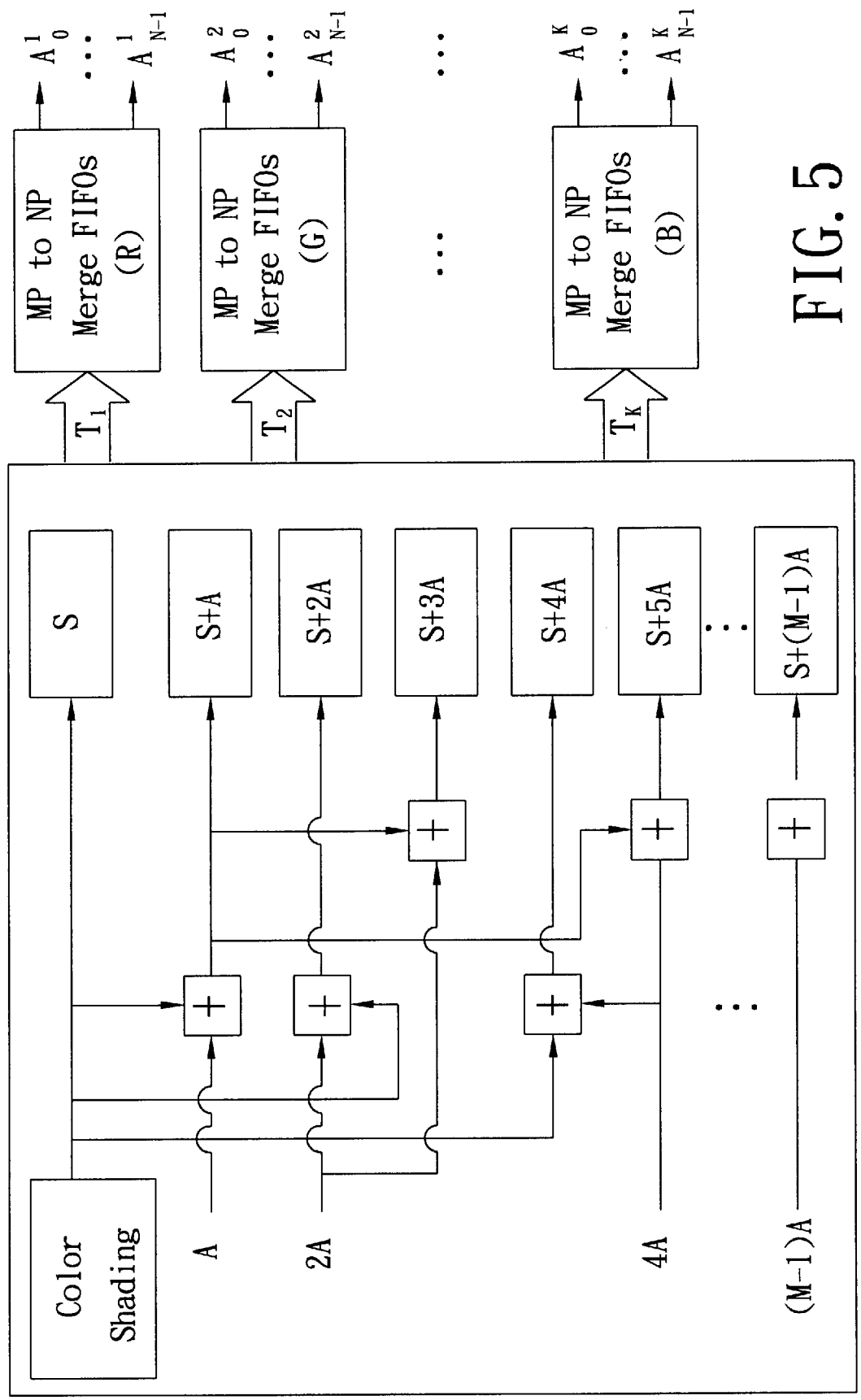
FIG.5 shows the block diagram of a generalized time sharing architecture according to the present invention.

FIG. 5 illustrates an example in which k graphics attributes are generated for M pixels. The attribute values for a specific attribute are generated for M pixels simultaneously. There are N data paths in the subsequent processes, where M=kN and k is an integer. FIG. 5 shows a generalized time sharing module, which uses only one color shading block to generate the k attributes of M pixels with N data paths for the following processes. Therefore, it is easy to extend this invention to multiple data paths. If the number of data paths N is equal to the number of pixels M, the "merge FIFO" can be replaced by simple registers for buffering the attributes.

Using the concept of time sharing with proper control of the number of pixels generated at a time, it can reduce the number of duplicated modules. Consequently, the advantage of this invention is to eliminate the requirement of duplicating similar function blocks in hardware design without performance degradation.

What is claimed is:

1. A method for computing attribute values of M pixels in a scan line for K different graphics attributes in a graphics display system, comprising:
   a. computing M attribute values of M pixels in a scan line simultaneously for a specific graphics attribute within one computing cycle;
   b. sending the computed M attribute values to an M-pixel to N-pixel merge FIFO, said merge FIFO having N different output data paths for sending out the computed attribute values of N pixels each computing cycle;
   c. repeating a. and b. for each of said K different graphics attributes and buffering the computed M attribute values associated with each different graphics attribute in a different M-pixel to N-pixel merge FIFO; and
   d. sending out all attribute values associated with every N pixels through respective output data paths each computing cycle after they are available;
   wherein M, K and N are positive integer numbers and M=K*N.

2. The method according to claim 1, wherein K=1 and said M-pixel to N-pixel merge FIFOs are registers.

3. The method according to claim 1, wherein all attribute values associated every N pixels for said K different graphics attributes are pipelined and sent out each computational cycle.

4. The method according to claim 1, wherein the attribute value of a pixel for a specific graphics attribute is computed by using a formula represented by A*X+B*Y+C,
   wherein X and Y are coordinate values of the pixel, and A, B and C are attribute coefficients associated with the specific graphic attribute.

5. The method according to claim 4, wherein the attribute value of a successive pixel having coordinate values X+1 and Y is computed by adding A to the attribute value of the pixel having coordinate values X and Y.

6. An apparatus for computing the attribute values of M pixels in a scan line for K different graphics attributes in a graphics display system, comprising:
   an attribute computational unit for simultaneously computing M attribute values of M pixels in a scan line within one computing cycle for a specific graphics attribute and sending out the computed M attribute values through one of K attribute output groups; and
   K separate M-pixel to N-pixel merge FIFOs, each merge FIFO being connected to one of said K attribute output groups for receiving M pixels' attribute values and then sending out the attribute values of every N pixels through N different output data paths;
   wherein M, K and N are positive integer numbers and M=K*N.

7. The apparatus according to claim 6, wherein K=1 and said M-pixel to N-pixel merge FIFOs are registers.

8. The apparatus according to claim 6, wherein all attribute values associated every N pixels for said K different graphics attributes are pipelined and sent out each computational cycle.

9. The apparatus according to claim 6, said attribute computational unit computing the attribute value of a pixel for a specific graphics attribute by using a formula represented by A*X+B*Y+C;
   wherein X and Y are coordinate values of the pixel, and A, B and C are attribute coefficients associated with the specific graphics attribute.

10. The apparatus according to claim 9, wherein the attribute value of a successive pixel having coordinate values X+1 and Y is computed by adding A to the attribute value of the pixel having coordinate values X and Y.

* * * * *